(12) United States Patent
Reiter et al.

(10) Patent No.: US 12,377,771 B2
(45) Date of Patent: Aug. 5, 2025

(54) CLEANING DEVICE FOR A WINDOW PANE

(71) Applicant: ZKW Group GmbH, Wieselburg (AT)

(72) Inventors: Thomas Reiter, Ferschitz (AT); Georg Pitterle, Kirnberg an der Mank (AT); Christian Jackl, Wieselburg (AT)

(73) Assignee: ZKW Group GmbH, Wieselburg (AT)

( * ) Notice: Subject to any disclaimer, the term of this patent is extended or adjusted under 35 U.S.C. 154(b) by 235 days.

(21) Appl. No.: 17/914,468

(22) PCT Filed: Feb. 22, 2021

(86) PCT No.: PCT/EP2021/054305
§ 371 (c)(1),
(2) Date: Sep. 26, 2022

(87) PCT Pub. No.: WO2021/190846
PCT Pub. Date: Sep. 30, 2021

(65) Prior Publication Data
US 2023/0123728 A1 Apr. 20, 2023

(30) Foreign Application Priority Data
Mar. 26, 2020 (EP) .................................... 20165949

(51) Int. Cl.
*B60S 1/56* (2006.01)
*B08B 7/02* (2006.01)
(Continued)

(52) U.S. Cl.
CPC ............ *B60Q 1/0005* (2013.01); *B08B 7/028* (2013.01); *B08B 11/00* (2013.01); *B08B 13/00* (2013.01);
(Continued)

(58) Field of Classification Search
None
See application file for complete search history.

(56) References Cited

U.S. PATENT DOCUMENTS

| 10,401,618 B2 | 9/2019 | Li et al. |
| 2012/0243093 A1* | 9/2012 | Tonar ................. H10N 30/20 359/507 |
| 2019/0077377 A1 | 3/2019 | Schmidt |

FOREIGN PATENT DOCUMENTS

FR 2841488 A1 1/2004

OTHER PUBLICATIONS

FR 2841488 translation, Detector, Especially Of Obstacles To Parking Behind Motor Vehicle, Has Transparent Window With Liquid Spray And Vibrator To Clean It, Eustache (Year: 2004).*

(Continued)

*Primary Examiner* — Cristi J Tate-Sims
(74) *Attorney, Agent, or Firm* — Eversheds Sutherland (US) LLP

(57) ABSTRACT

The invention relates to a cleaning device (20) for a lens glass (10) in particular of a vehicle, with an optically transparent lens glass (10), with a hydrophobic and dirt-repelling, optically transparent coating (25), which is applied on an outer side (11) of the lens glass (10), with at least one vibration element (21), which is coupled with the lens glass (10), wherein the at least one vibration element (21) can be activated by a control device (40), and with an optically transparent anti-fog device (30), which is arranged at an inner side (12) of the lens glass (10). Furthermore, a vehicle with at least one cleaning device (20) is specified within the scope of the invention.

15 Claims, 4 Drawing Sheets

(51) Int. Cl.
  *B08B 11/00*    (2006.01)
  *B08B 13/00*    (2006.01)
  *B08B 17/02*    (2006.01)
  *B60J 1/00*     (2006.01)
  *B60Q 1/00*     (2006.01)
  *B60S 1/02*     (2006.01)
  *G02B 1/18*     (2015.01)
  *G02B 27/00*    (2006.01)

(52) U.S. Cl.
  CPC ............... *B08B 17/02* (2013.01); *B60J 1/002* (2013.01); *B60S 1/026* (2013.01); *B60S 1/56* (2013.01); *G02B 1/18* (2015.01); *G02B 27/0006* (2013.01)

(56) References Cited

OTHER PUBLICATIONS

International Search Report for PCT/EP2021/054305, dated Apr. 16, 2021 (10 pages).
Search Report for European Patent Application No. 20165949.7 dated Sep. 11, 2020 (7 pages).

\* cited by examiner

CLEANING DEVICE FOR A WINDOW PANE

The invention relates to a cleaning device for a lens glass, in particular of a vehicle.

Different cleaning devices in numerous embodiments are already known from the prior art for headlamps, in particular for vehicle headlamps. For example, headlamp cleaning systems have already long been known, in which a cleaning liquid is sprayed by means of high-pressure from outside onto the one or more cover glasses of a headlamp. Especially in the case of front headlamps of a vehicle, such soiling of the cover glass can be reliably removed. A drawback with such headlamp cleaning systems is that the latter consist of numerous parts and components which are prone to failure and maintenance-intensive. With such high-pressure washing systems which usually have a high consumption of washing liquid, therefore, storage tanks with several litres of washing liquid are required. As a washing liquid, use is usually made of water with suitable additives such as in the summer with suitable insect remover or in winter with suitable frost protection. The nozzles of such a high-pressure system spray the water at pressures of up to 50 bar from mobile nozzles from outside onto the cover glasses of the headlamps. The cover glasses can become prematurely cloudy if unsuitable additives are used, which is a further drawback of these previously known cleaning systems. For vehicles which are equipped with such headlamp cleaning systems, the legislator also examines their proper functioning. Vehicle owners, who are unhappy with their high water consumption of the headlamp cleaning system and therefore allow the latter to deactivate, risk having the operating license for their vehicle cancelled.

Moreover, such headlamp cleaning systems for front headlamps are problematic from the viewpoint of pedestrian protection, because on account of the high-pressure cleaning nozzles mounted mobile, which are usually integrated in the area of the front bumper, the risk of injury in the event of a collision of the vehicle with a pedestrian increases.

Brush and wiper cleaning systems, which have long been known and which mechanically clean the outer sides of the cover glasses of headlamps during the journey, are in turn many times more expensive in terms of equipment and also more maintenance-intensive than the aforementioned headlamp cleaning systems with a high-pressure pump. Furthermore, in the case of mechanically operating systems for cover glasses of headlamps, the wear on the wipers and/or brushes after a certain amount of time in operation is a drawback.

In addition to the actual headlamps, numerous optical devices such as optical sensors, cameras and see-through displays are also usually incorporated in modern vehicles. These optical devices are usually protected by cover glasses against weathering influences or soiling. For example, optical sensors can be integrated into headlamp systems and/or backlight systems or can be arranged behind the windscreen, the backlight or the sidelights of a vehicle.

In order to keep the field of view (FOV), i.e. the area of the viewing angle of an optical device, a solar sensor, the image area of a camera or a camera-shot sensor, free from soiling, condensation formation and/or icing-up, however, the aforementioned conventional headlamp cleaning systems are not suitable. Optical sensors and cameras have much higher demands on a clear view in respect of cleaning or de-icing or defrosting of such cover glasses, because otherwise reliable functioning of such sensors and cameras cannot be provided.

The purpose of the present invention, therefore, is to overcome the drawbacks previously known from the prior art for cleaning systems for cover glasses of a vehicle and to specify a cleaning system which is designed as cost-effectively and compact as possible with the fewest possible component parts and subassemblies and which guarantees, with as little wear as possible and as maintenance-free as possible, a clear view for sensitive optical devices and optical sensors, which in particular are incorporated in a vehicle. Furthermore, it is a problem of the invention to specify a cleaning device, which as far as possible manages to operate without the use of washing liquid or other consumables.

The problem is solved with a cleaning device according to the preamble of claim 1 with the features of the characterising part of claim 1.

The sub-claims relate to further advantageous embodiments of the invention.

Generally, the assignment of terms relating to location or orientation, such as for example "horizontal", "vertical", "in a horizontal direction", "in a vertical direction", "above", "below", "in front of", "beneath the latter", "above the latter", "inside", "outside", etc. are selected in the following text solely for the sake of simplification and these terms possibly relate to the representation in the drawings, but not necessarily to an actual position in use or position of the cleaning device according to the invention, its components or a vehicle or motor vehicle equipped with the cleaning device.

According to the invention, a cleaning device for a lens glass particularly of a vehicle comprises
- an optically transparent lens glass,
- a hydrophobic and dirt-repelling optically transparent coating, which is applied on an outer side of the lens glass,
- at least one vibration element, which is coupled with the lens glass, wherein the at least one vibration element can be activated by a control device, and
- an optically transparent anti-fog device, which is arranged at an inner side of the lens glass.

Advantageously, the following components cooperate efficiently in a cleaning device according to the invention for cleaning a lens glass:
  (i) the optically transparent lens glass, which comprises a hydrophobic and dirt-repelling optically transparent coating at its outer side and ensures that soiling in the form of dirt particles or dirty water does not adhere on account of minimised adhesion to the coated outer side of the lens glass, but rather the dirt particles run off from the lens glass;
  (ii) the at least one vibration element, which is coupled with the lens glass and which can be activated by a control device, ensures that the lens glass, whenever dirt begins to collect on its outer side or when it becomes necessary, is caused to vibrate and the soiling can thus be shaken off from the lens glass;
  (iii) an optically transparent anti-fog device, which is arranged at the inner side of the lens glass, ensures that the inner side of the lens glass also remains free from condensation formation.

Advantageously, the use of a cleaning device according to the invention for a lens glass makes it possible for a lens glass thus equipped to meet particularly high demands as a cover for optical sensors or cameras, in particular of a vehicle.

With a lens glass which is provided with the cleaning device according to the invention, the field of vision of an optical device, for example a solar sensor, the image area of a camera or a camera-shot sensor can be reliably kept free from soiling, from condensation formation and/or from icing-up. The reliable functioning of optical sensors and cameras, which have higher demands on the clear view with regard to the cleaning or de-icing or defrosting, can be guaranteed by the use of a lens glass together with the associated cleaning device.

Depending on the embodiment, in the cleaning device according to the invention the at least one vibration element can be fastened directly abutting against the lens glass or the vibration element can be arranged on another element such as for example a counterweight, wherein the counterweight lying beneath is fastened to the lens glass. In this case, too, the vibration element is fastened to the lens glass, but with a further layer such as for example a counterweight between the lens glass and the vibration element.

Furthermore, the lens glass can be fastened in a supporting bezel or a corresponding frame, which is coupled with the least one vibration element. In this way, the supporting bezel or frame of the lens glass can be vibrated and the vibrations of the at least one vibration element are directly transmitted to the lens glass. The fastening of the vibration element to the cover glass has the advantage that the oscillations or vibrations are introduced locally into the cover glass and the cleaning of the cover glass is thus particularly efficient.

The at least one vibration element can comprise for example an ultrasonic oscillator, which causes the lens glass to vibrate directly or—in the case of a supporting bezel or frame of the lens glass coupled with the vibration element—indirectly with frequencies in the ultrasound range from 16 kHz and thus serves to shake off soiling, for example in the form of dirt particles, water droplets or an ice coating, from the lens glass.

So-called nanocoatings can for example be used as a hydrophobic and a dirt-repelling coating, which make use of the Lotus effect. Dirt and surface experience here very small adhesive forces. Moisture particles and dirt particles are enclosed in the water rolling off and the soiling simply rolls off from the hydrophobic coating.

Scratch-resistant, weather-protected coating materials, which cure by UV radiation and provide protection for lens glasses made for example from optically transparent polycarbonate (PC) or polymethyl methacrylate (PMMA) against abrasion, chemical damage, erosion or yellowing due to UV radiation and against soiling, can also be applied as a hydrophobic or a dirt-repelling coating on the outer side of the lens glass. Such coatings, which amongst other things serve as weather protection for cover glasses, are also referred to as silicone hardcoat. For example, such a coating material, which is suitable for the weather-resistant and dirt-repelling coating of cover glasses of vehicle headlamps, is marketed by Momentive Performance Materials Inc. (www.momentive.com) under the product name SilFORT* UVHC5000.

Advantageously, the least one vibration element can be fastened to the lens glass with a cleaning device according to the invention.

This embodiment offers the advantage that with one or more vibration elements, which are directly fastened to the lens glass abutting against the latter, vibrations can be transmitted to the lens glass particularly efficiently and as far as possible without loss. It is also conceivable within the scope of the invention for at least one counterweight to be fastened to the lens glass and for at least one vibration element to be coupled with the counterweight. Vibrations of the vibration element, which is coupled with the counterweight, are transmitted from the vibration element to the counterweight and from the latter, in an intensified form, directly onto the lens glass. The vibrating effect of the vibration element is intensified as resonance of the counterweight coupled therewith and thus further improves the cleaning effect of the lens glass.

Within the scope of the invention, the at least one vibration element can also be integrated into the lens glass in a cleaning device.

In this embodiment, the at least one vibration element is particularly effectively integrated into the lens glass against damage or weathering influences. Vibrations of the vibration element, which are activated by the control device, are advantageously introduced in the lens glass directly on the spot for the desired cleaning. Vibration losses are thus reliably avoided. In the case of lens glasses made for example of optically transparent polycarbonate (PC) or polymethyl methacrylate (PMMA), one or more vibration elements can be integrated into the lens glass for example during the production process by means of insert moulding or injection moulding by inserting the vibration element in the injection moulding process.

In a further expedient embodiment of the invention, in a cleaning device the least one vibration element can be coupled with a supporting bezel, to which the lens glass fastened. A supporting bezel is understood to be a frame for the lens glass. The one or more vibration elements can be coupled with the supporting bezel or directly integrated into the supporting bezel. Such a supporting bezel or frame offers the advantage that the lens glass is protected at its edges by the supporting bezel and the vibrations are introduced uniformly into the lens glass. During the cleaning operation, i.e. during the introduction of vibrations by the at least one vibration element, the lens glass is this also protected as well as possible against mechanical loads.

A cleaning device according to the invention can be designed particularly compact, if the at least one vibration element is integrated into the supporting bezel of the lens glass.

The lens glass can advantageously be connected in one piece to the supporting bezel and can be changed or replaced together with the supporting bezel or at least together with a frame if required.

In a further variant of embodiment of the invention, at least one vibration element can be permanently connected by jointing to the lens glass and/or to the supporting bezel in the case of a cleaning device.

The term "jointing" groups together different jointing methods according to DIN 8593-1. In jointing, two or more solid bodies, the jointing parts, are connected or jointed permanently with one another with a geometrically determined form. In some jointing methods, use is also made of a "formless" auxiliary material, i.e. a material whose shape is not defined. For example, adhesives are understood to be such an auxiliary material.

In the present case, the at least one vibration element can be connected permanently to the lens glass and/or the supporting bezel for example by the following jointing methods:

by gluing with adhesive;
by screwing with screws directly through the cover glass and/or with the supporting bezel, or in the form of a screw clip on the lens glass and/or the supporting bezel;
by form-fit staking. The cover glass and/or the supporting bezel becomes the holder or adapter of the vibration unit by thermoplastic deformation;

by bayoneting of the vibration element with the lens glass and/or the supporting bezel. The term bayoneting is understood by the person skilled in the art to mean assembling or coupling as a suitable combination and sequence of pushing and rotation. The coupling usually takes place by a linear (translatory) and then rotational movement. A bayonet connection holds by means of a form-fit connection, the opening can take place by overcoming static friction and/or spring force and/or evading or opening a lock stage or lock:

by a splay connection. With spring-loaded splaying, the joint part is first elastically deformed. After the insertion or pushing in, the elastic rebound occurs. Examples are clip connections, snap-in connections, splay rings, sheet metal springs, and safety rings, which can be used to fasten the at least one vibration element to the lens glass or supporting bezel.

In a cleaning device according to the invention, the optically transparent anti-fog device can particularly expediently be a fog-impeding coating, which is applied on the inner side of the lens glass.

This embodiment offers the advantage that the lens glass can not only be cleaned on its outer side free from soiling and weathering influences, but also on its inner side. Inner side is understood to mean the side of the lens glass lying opposite the outer side, which in the installed position, for example in the case of a headlamp, in particular in a vehicle headlamp, is orientated towards the housing of the headlamp. In order to prevent undesired condensation formation on the inner side of the glass in damp or cold weather, the inner side of the lens glass is provided with a fog-retarding coating in this embodiment of the invention.

Such coatings known as "anti-fog" coatings, for example for cover glasses made of transparent polycarbonate (PC) or polymethyl methacrylate (PMMA), are available under the name MODIPER® H from the producer NOF Corporation (www.nof.co.jp).

In an advantageous alternative of the invention, in a cleaning device the optically transparent anti-fog device can comprise a heating element with a heating film and/or with heating wires, wherein the heating film and/or heating wires is or are fastened to the inner side of the lens glass or at least partially integrated into the lens glass.

Alternatively or in addition to a fog-repelling coating arranged on the inner side of the glass, a heating film and/or a heating element with heating wires which are integrated into the lens glass can also be provided on the inner side of the lens glass. Such electrical components can be expediently controlled and activated by the same control device which serves to activate the at least one vibration element. If need be, condensation formation on the inner side of the lens glass can thus be prevented and fogging at the inner side of the glass can quickly be dried off.

In a development of the invention, an anti-reflection coating can be applied on the outer side and/or on the inner side of the lens glass in the case of a cleaning device.

An anti-reflection coating offers the advantage that transmission losses are markedly reduced. In addition, self-glare by light modules can be prevented as far as possible in the case of camera-based applications with a corresponding wavelength-specific anti-reflection coating. The efficiency of the camera sensors is thus increased.

When use is made of sensor technologies such as LiDAR (light detection and ranging), FIR (far infrared, long-wave IR-radiation of 15 µm to 1 mm), SWIR (shortwave infrared, short wavelength, wavelengths of 1.4 µm to 3 µm) or NIR (near infrared, with wavelengths of 780 nm to 1400 nm), an anti-reflection coating of the lens glass can advantageously contribute towards noise reduction, as a result of which the efficiency of the corresponding sensors is also increased.

It can be particularly effective for the inner side and also the outer side of the lens glass to be provided with an anti-reflection coating.

It can be particularly advantageous if the at least one vibration element is a piezoelement generating ultrasonic vibrations in a cleaning device according to the invention.

Piezoelectric vibrators, i.e. resonant operated piezoactuators, which serve for ultrasound regeneration at frequencies of 16 kHz to 200 kHz, offer the advantage of a particularly compact design, which is particularly important especially when used in vibration elements that are designed as small as possible or in compact vibration units, which are fastened to the cover glass of headlamps or vehicle headlamps as inconspicuously as possible. On account of the small size of such piezoactuators or piezoelectric vibrators, they are also suitable for being directly integrated into the cover glass, as a result of which the efficiency of the cleaning device—as already stated previously—can be further increased.

A cleaning device according to the invention can clean a lens glass particularly efficiently, if two or more vibration elements spaced apart from one another are coupled with the lens glass, wherein the two or more vibration elements can each be activated by a control device.

Depending on the local circumstances and requirements regarding the cleaning tasks, a plurality of vibration elements can be arranged distributed over the area of a lens glass or coupled with the lens glass at sections spaced apart from one another. Expediently, positions of the vibration elements are selected on the lens glass or along the latter, which are not arranged directly in the optical path of a sensor or a camera located under the lens glass and do not therefore interfere with the sensor or the camera.

It can be particularly advantageous if the control device cooperates with a camera and/or with a sensor, preferably an optical sensor, in a cleaning device according to the invention.

The signal coupling of the cleaning device or of its control device with a camera and/or a suitable sensor, which detects the soiling of the cover glass, offers the advantage that the cleaning device can be automatically activated if need be. For example, in the case of a motor vehicle it can be detected by a camera whether the present weather conditions call for cleaning of the cover lens for example during rainfall or snowfall.

Depending on the area of application and weather conditions, it may be expedient if the activation of the at least one vibration element by the control device takes place according to an activation scheme in a cleaning device according to the invention, which is selected from the group comprising: cyclically recurring activation, manual activation, activation by means of a sensor signal, activation by means of a camera signal.

For example, the following variants are conceivable for the activation of the at least one vibration element from the control device:

cyclically recurring: the at least one vibration element is activated in defined time intervals, irrespective of the prevailing conditions (wetness, soiling etc.)

by means of a manual activation: for example, the activation of the at least one vibration element of the cleaning device can take place in combination with the activation of windscreen cleaning, the "windscreen wiper", in a vehicle. The control device receives a signal from the windscreen cleaning, whereupon a vibration element of the cleaning device is activated.

the vibration element is activated by means of a rain sensor on the windscreen or on the cover glass of a vehicle.

the soiling of the lens glass is detected by means of a camera in the headlamp.

Furthermore, provision is made within the scope of the invention such that the at least one vibration element of the cleaning device can be activated and operated by the control device at different frequencies and/or amplitudes and/or time intervals and/or time durations. Different cleaning programs can thus be set with the cleaning device, in order to be able to clean as efficiently as possible the lens glass provided with the cleaning device, if possible adapted to the given individual cleaning task. For example, it may be expedient if the cleaning of the lens glass during dry weather proceeds, for example, with a greater frequency and amplitude of the vibrations of the at least one vibration element than during cleaning in rainy weather. In wet, damp weather conditions with rainfall, it may for example be sufficient if the cleaning of the lens glass for shaking off rain drops and moisture proceeds with a comparatively lower frequency and a smaller amplitude of the vibrations of the one or more vibration elements than is expedient in dry weather conditions.

It can be particularly advantageous if the lens glass coupled with the at least one vibration element is replaceable in a cleaning device according to the invention.

The lens glass can for example be fastened as a replaceable module in the supporting bezel or a frame and can simply be replaced if necessary. It can also be expedient in an alternative embodiment if the lens glass forms a module together with the supporting bezel or the frame and can easily and cost-effectively be replaced. This also offers the advantage that electronic components such as optical sensors or a camera, which for example are incorporated in a vehicle and protected by a corresponding lens glass to the exterior against weathering influences, are accessible from outside simply by removing the lens glass. The lens glass alone or together with a removable supporting bezel or frame thus also serves as an inspection and maintenance cover of the optical components lying beneath.

In order to ensure a rapid and secure replacement, the lens glass or the lens glass together with at least a section of the supporting bezel can be opened and closed again for example by means of a quick-change lock or a bayonet connexion. Corresponding seals provide for a hermitically acting seal between the lens glass and its frame or the surrounding housing of for example a vehicle headlamp, insofar as the lens glass is integrated into a vehicle headlamp for example as a cover for optical components.

In a development of the invention, a lens glass can be arranged inside a cover glass of a vehicle in a cleaning device, wherein the cover glass is selected from the following group: windscreen, sidelight, backlight, headlamp cover glass, optical lens.

The lens glass provided with the cleaning device has in itself properties which are as homogeneous as possible and can form a module inside a larger cover glass. For example, such a lens glass can be arranged inside a windscreen, a sidelight or a backlight of a vehicle or can be integrated into such a light. Especially with the use of a supporting bezel as a frame of a lens glass, the latter can be integrated particularly inconspicuously in the surrounding cover glass. For example, the lens glass can be arranged for this purpose in a tinted strip at the edge of the respective cover glass, for example the windscreen.

The lens glass provided with the cleaning device can also be integrated into a headlamp cover glass of a vehicle or into an optical lens of a headlamp.

The aforementioned advantages of the cleaning device according to the invention apply equally to a headlamp provided with a cleaning device, in particular a vehicle headlamp. In the present application, a cleaning device is mentioned in each case for the sake of simplification. It is obvious that the invention also includes headlamps, for example, which comprise a plurality of cleaning devices each with a lens glass for covering a particularly sensitive optical sensor or camera. The term cleaning device also includes different embodiments with one vibration element or also with a plurality of vibration elements.

Within the scope of the invention, a vehicle is also specified with at least one cleaning device.

The aforementioned advantages and advantageous effects of the invention apply equally to a vehicle, which is provided with one or more lens glasses with a cleaning device according to the invention.

Advantageously, for cleaning a lens glass equipped with a cleaning device according to the invention, which is arranged in a vehicle headlamp, it is possible to dispense with the use of external washing liquid together with the liquid tank usually required for this and apparatus such as pumps, feedlines and washing nozzles for spraying the washing liquid onto the cover glasses of vehicle headlamps.

Further details, features and advantages of the invention emerge from the following explanation of examples of embodiment of the invention represented schematically in the drawings. In the drawings.

A detailed description of the figures follows.

Figure 1:
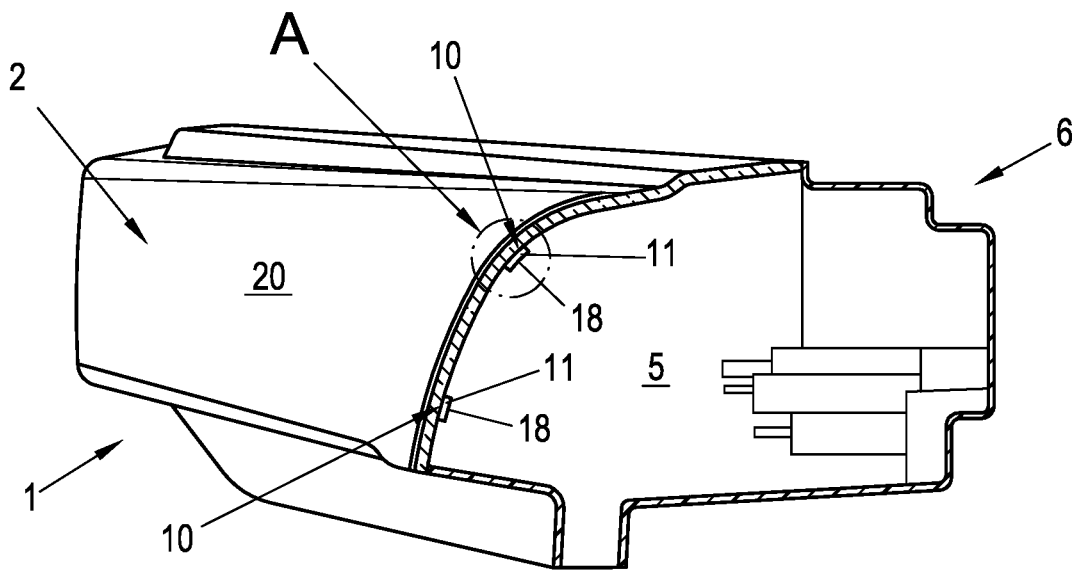
FIG. 1 shows in an isometric view obliquely from in front a vehicle headlamp with a lens glass, which is provided with a cleaning device according to the invention.

FIG. 1 shows vehicle headlamp 1 with a cover glass 2, into which a lens glass 10, which is provided with a cleaning device according to the invention, is integrated. Vehicle headlamp 1 represented here comprises a cover glass 2, which is produced for example from transparent polycarbonate (PC) or polymethyl methacrylate (PMMA). Cover glass 2 comprises an outer side 3. Outer side 3 of cover glass 2 in the installed position of the vehicle headlamp 1 is exposed to environmental influences. Inner side 4 of cover glass 2 in the installed position is orientated towards an interior 5 of vehicle headlamp 1, which is formed by a housing 6 and cover glass 2.

Figure 2:
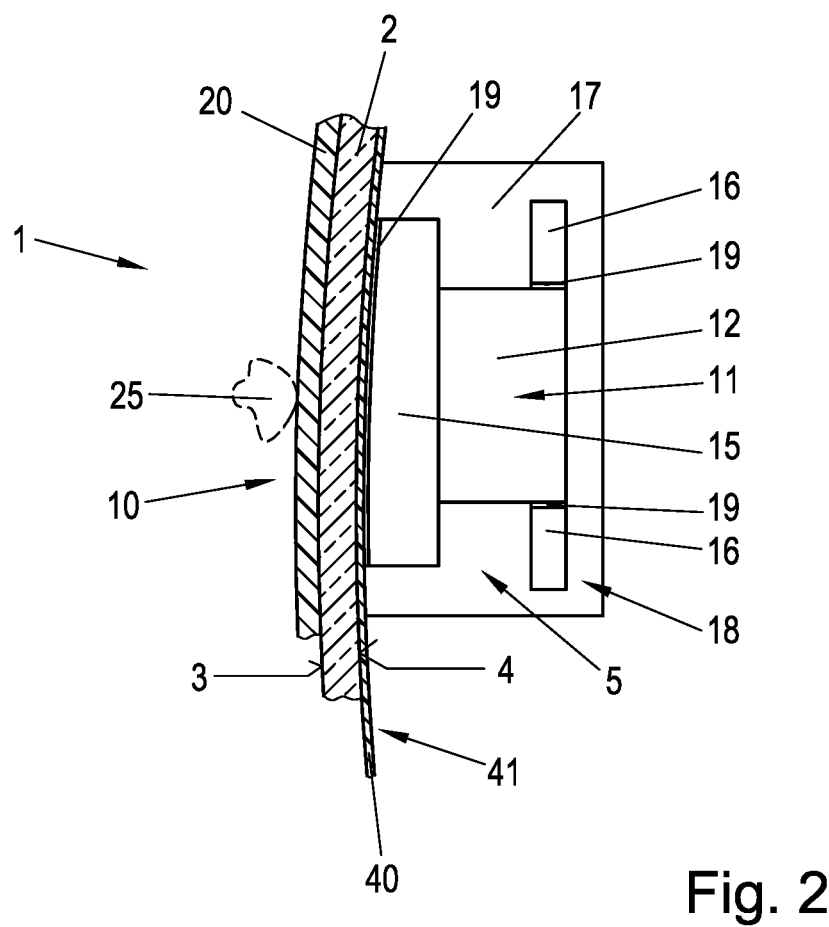
FIG. 2 shows in a partially cross-sectional view from the side a detail of the lens glass illustrated in FIG. 1 together with the associated cleaning device.

FIG. 2 shows a detail of lens glass 10 illustrated in FIG. 1 together with an associated cleaning device 20.

Figure 3:
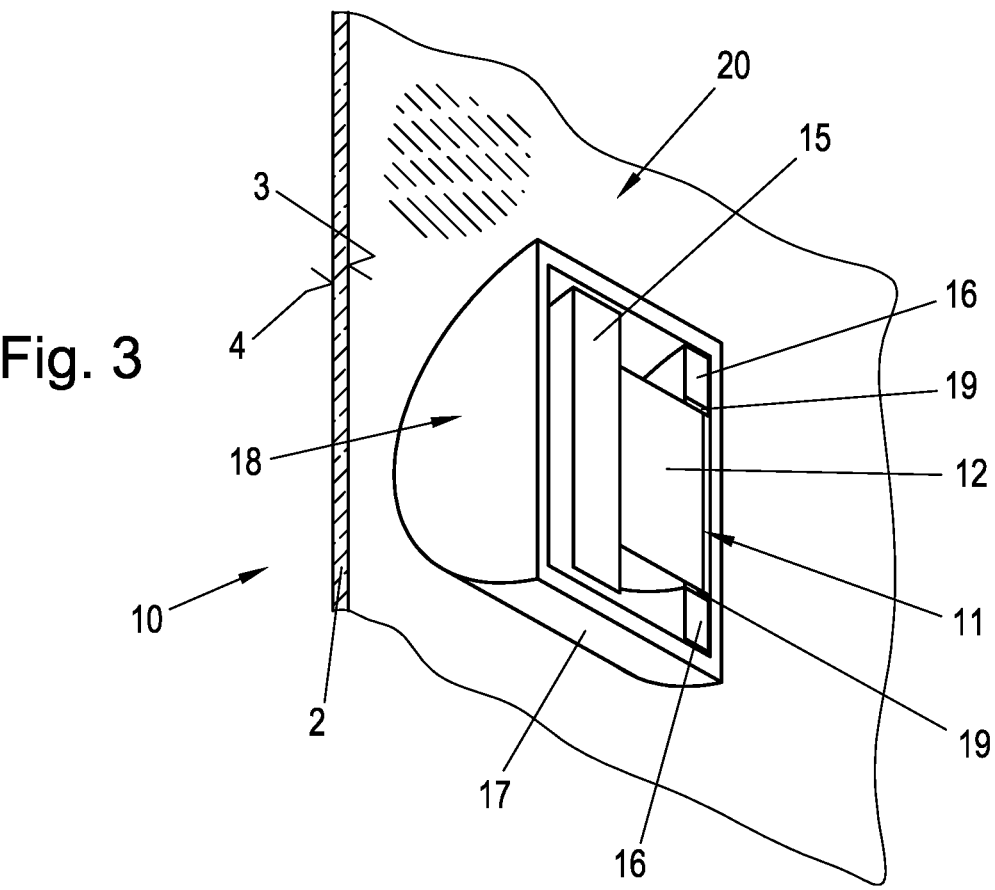
FIG. 3 shows in an isometric view obliquely from above detail A marked in FIG. 2 of the lens glass together with the associated cleaning device.

FIG. 3 represents detail A marked in FIG. 2 of lens glass 10 together with associated cleaning device 20. The following description of the figures relates equally to both FIGS. 2 and 3.

Cleaning device 20 according to the invention for a lens glass 10, which here is integrated for example in a vehicle headlamp 1, comprises, apart from optically transparent lens glass 10, at least one vibration element 21 which is coupled with lens glass 10. Vibration element 21 is expediently incorporated or integrated into a supporting bezel 15, which serves as a frame of lens glass 10.

Lens glass 10 is produced here for example from polymethyl methacrylate (PMMA) and comprises an outer side 11 and an inner side 12. Lens glass 10 is provided with a hydrophobic and dirt-repelling coating 25 at its outer side 11. A silicone hardcoat coating is used here as outer-side dirt-repelling coating 25, which serves as weather protection for lens glass 10 and which is water-repelling (hydrophobic) and also oil-repelling (oleophobic). The coating thickness of the silicon hardcoat coating amounts for example to 8 µm to 12 µm.

An anti-fog device 30, for example in the form of a fog-retarding coating 31, is provided at inner side 12 of lens glass 10. Lens glass 10 can comprise for example at its periphery a screw thread and can be fastened in a screwable manner in supporting bezel 15. In the embodiment shown here, lens glass 10 is glued fixed to supporting bezel 15 or vibration element 21 with an adhesive film 18. An interposed seal 16 between lens glass 10 and the frame of supporting bezel 15 prevents the undesired penetration of moisture into the interior of the vehicle headlamp protected by lens glass 10. Undesired condensation formation at inner side 12 of lens glass 10 is thus prevented as far as possible.

Vibration element 21 arranged running around in the peripheral direction of lens glass 10 can be activated by a control device not explicitly shown here. Vibration element 21 is designed for example a piezoelement 22 or as a piezoelectric vibrator 22. Piezoelectric vibrator 22 is a resonant operated piezoactuator, which serves for ultrasound generation at frequencies of 16 kHz to 200 kHz. Piezoelectric vibrator 22 in this embodiment here is fastened in an annular notch of supporting bezel 15. Vibration element 21 is glued to inner side 12 of lens glass 10 by means of adhesive 18 or adhesive films 18. The integration of vibration element 21 inside supporting bezel 15 offers the advantage of a closed, encapsulated design. Vibration element 21 now only has to be contacted electrically with a corresponding control device, in order to be able to be activated by the control device.

Supporting bezel 15 together with lens glass 10 and vibration element 21 integrated into supporting bezel 15 is designed as a replacement module and can easily and cost-effectively be replaced if need be.

Figure 4:
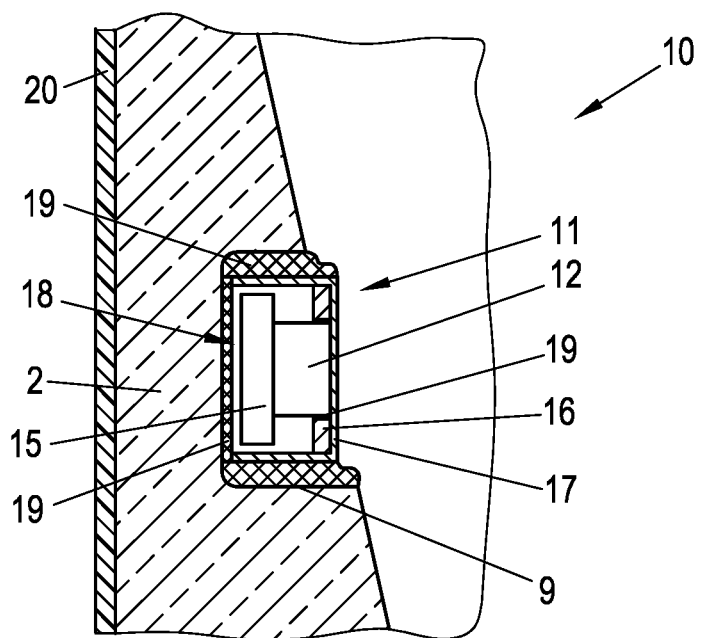
FIG. 4 shows in a cross-sectional view from the side details of a cleaning device together a lens glass fastened in a supporting bezel.

FIG. 4 shows from the side details of a cleaning device 20 together with a lens glass 10 fastened in a supporting bezel 15. The arrangement shown here essentially corresponds to the preceding description in respect of FIGS. 2 and 3.

Lens glass 10 is produced here for example from polymethyl methacrylate (PMMA) and comprises an outer side 11 and an inner side 12. On its outer side 11, lens glass 10 is provided with a hydrophobic and dirt-repelling coating 25 in the form of a silicone hardcoat coating.

An anti-fog device 30, here in the form of a heating film 34 with heating wires 33, is fitted at inner side 12 of lens glass 10. Anti-fog device 30 is controlled by means of a heating element 32, wherein heating element 32 is controlled from a central control device 40 by means of corresponding signal lines 41.

Lens glass 10 is fixedly glued to supporting bezel 15 or to vibration element 21 with an adhesive film 18. An interposed seal 16 between lens glass 10 and the frame of supporting bezel 15 prevents the undesired penetration of moisture into the interior protected by lens glass 10, in which for example a photosensor 42 or a camera 43 is located. Undesired condensation formation at inner side 12 of lens glass 10 is thus prevented as far as possible.

Vibration element 21 arranged running around in the peripheral direction of the lens glass 10 can be activated by control device 40. Vibration element 21 is designed for example a piezoelement 22 or as a piezoelectric vibrator 22. Control device 40 is connected for this purpose by means of signal lines 41 to vibration element 21. Soiling 29 for example in the form of dirt or raindrops is detected at the outer side of lens glass 10 with photosensor 42 or camera 43. Activation of vibration element 21 thus takes place through control device 40 after a signal is received from camera 43 or photosensor 42. Sensor 42 can also serve for example redundantly for checking the proper functioning of vibration element 21 or camera 43.

Figure 5:
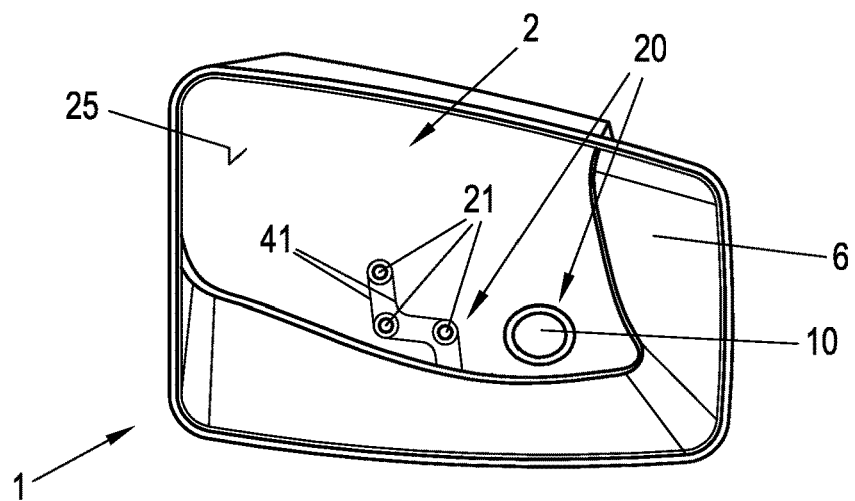
FIG. 5 shows in a plan view a vehicle headlamp with a lens glass with the cleaning device according to the invention, wherein a plurality of vibration elements are also integrated into the cover glass for cleaning.

FIG. 5 shows vehicle headlamp 1 with a lens glass 10 with a cleaning device 20 according to the invention, wherein lens glass 10 is arranged inside cover glass 2. In addition, a plurality of vibration elements 21 for cleaning are also integrated into cover glass 2 in this embodiment. Cover glass 2 is also provided here at its outer side 3 with a hydrophobic, dirt-repelling coating 25. Cover glass 2 comprises a fog-impeding coating 31 at inner side 4. Individual vibration elements 21 are connected with signal lines 41 to a control device not explicitly represented and can be activated in common from the control device. Not only lens glass 10 can thus advantageously be particularly thoroughly cleaned with cleaning device 20 provided for the purpose, in order to guarantee the proper functioning of a sensitive optical sensor or a camera lying behind or beneath the latter. In addition, cover glass 2 of vehicle headlamp 1, which surrounds lens glass 10 and which protects in a manner know per se the lamp and optical components such as reflectors or lenses of the headlamp lying beneath the latter, can also be cleaned by a cleaning device 20. Expediently, vibration elements 21 for cleaning both lens glass 10 and also cover glass 2 can be controlled from a central control device. Lens glass 10 comprises at its inner side 12 an anti-fog device with a heating element and a heating film. This anti-fog device can also be regulated and controlled from the central control device.

Figure 6:
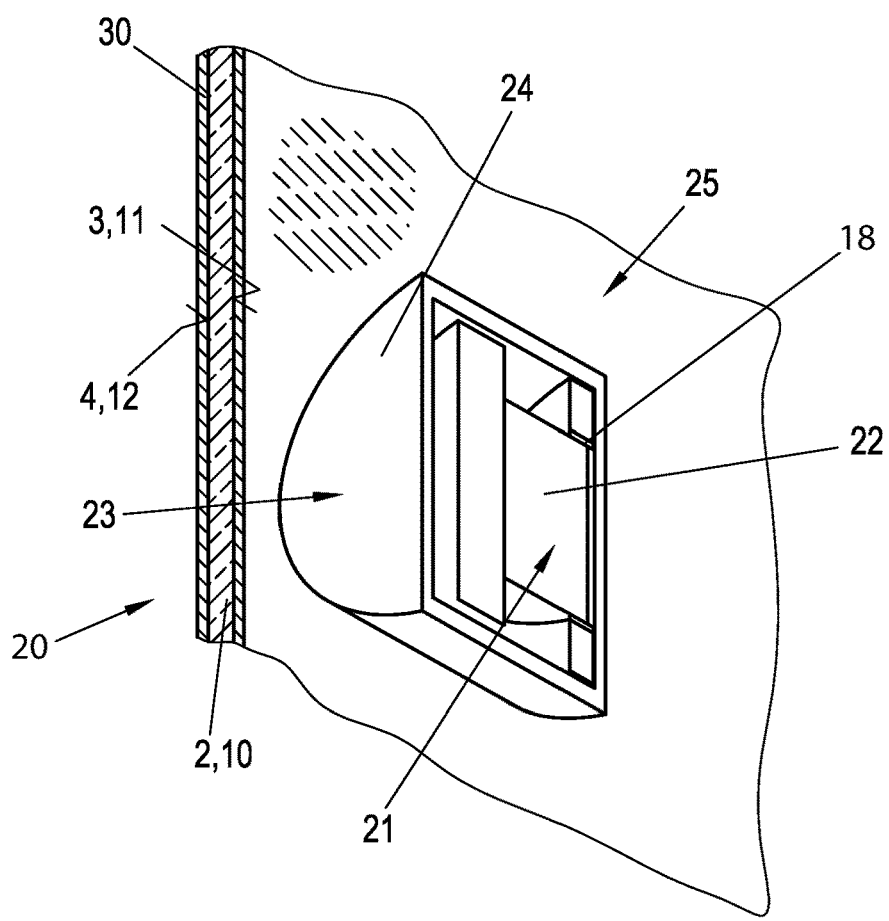
FIG. 6 shows in an isometric view obliquely from above a cleaning device with a vibration unit fastened to the lens glass, in which a vibration element is integrated.

FIG. 6 shows a cleaning device 20 fastened to a lens glass 10 with a vibration unit 23, in which a vibration element 21 is integrated inside a housing 24. Vibration unit 23 is glued by mean of an adhesive 18 to inner side 12 of lens glass 10. Vibration element 21 in the form of a piezoelement 12 is connected here to the counterweight. Both the counterweight, and also vibration element 21, abut directly against lens glass 10 inside housing 24. Vibrations of vibration unit 23 are thus particularly efficiently introduced directly into lens glass 10. Soiling, which lies on outer side 11 of lens glass 10 with a hydrophobic coating 25, can thus be particularly effectively shaken off when required by means of the resonant vibrations of piezoelectric vibrator 22.

Such vibration units 23 for cleaning devices can also arranged on cover glass 2 of a vehicle headlamp 1, as for example illustrated in FIG. 5. In this case, vibration unit 23 is glued by means of adhesive layer 18 to inner side 4 of cover glass 2.

Figure 7:
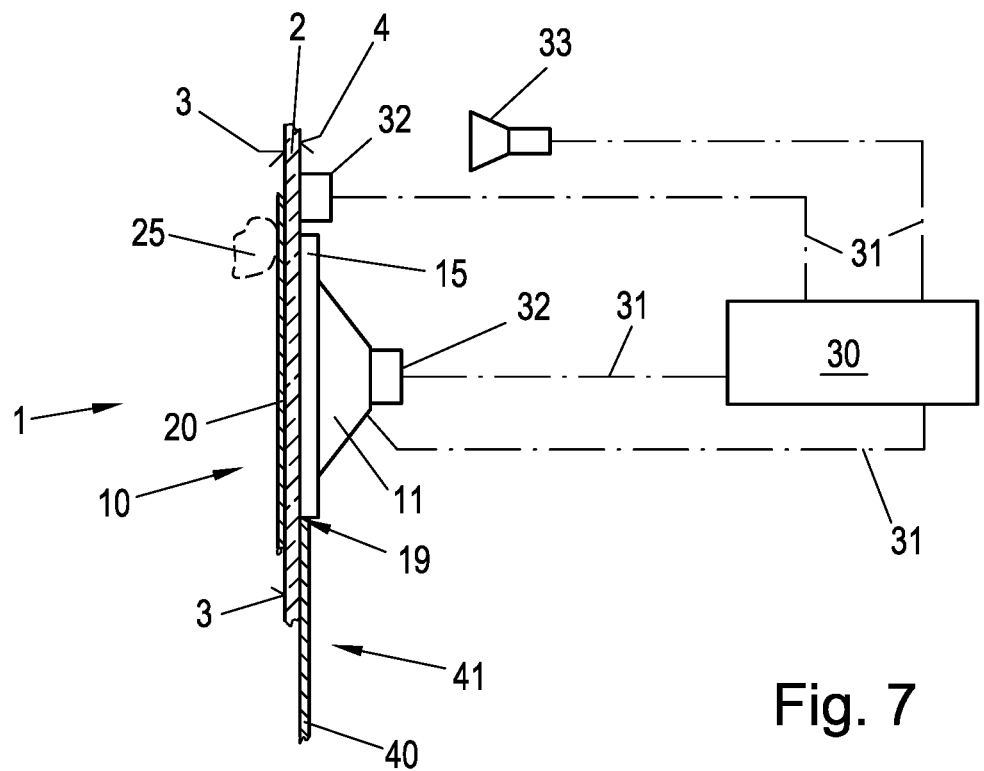
FIG. 7 shows in a partial cross-sectional view from the side a variant of a cleaning device according to the invention together with the associated control system, wherein a vibration unit is integrated into the lens glass.

FIG. 7 shows a variant of a cleaning device 20 according to the invention together with the associated control system, wherein a vibration unit 23 is integrated in a lens glass 10. Vibration unit 21 is embedded here in a recess in lens glass 10. The cavity has been filled subsequently with a glass-clear setting adhesive 18 after the embedding of vibration unit 21.

Located behind lens glass 10 is a protected interior 5 of a vehicle headlamp in which for example a photosensor 42 or a camera 43 is located.

Vibration element 21 integrated into lens glass 10 can be activated by a control device 40. Vibration element 21 is designed for example as a piezoelement 22 or as a piezoelectric vibrator 22. Control device 40 is connected to vibration element 21 by means of signal lines 41. With photosensor 42 or camera 43, soiling 29 for example in the form of dirt or raindrops at the outer side of lens glass 10 is detected. The activation of vibration element 21 thus takes place through control device 40 after a signal from a camera 43 or photosensor 42 is received. Sensor 42 can for example also serve redundantly for checking the proper functioning of vibration element 21 or camera 43.

Anti-fog device 30 is provided here in the form of a heating film 34 with heating wires 33 at the inner side 12 of the lens glass 10. Anti-fog device 30 is controlled by means of a heating element 32, wherein heating element 32 is also controlled from a central control device 40 by means of corresponding signal lines 41.

Figure 8:
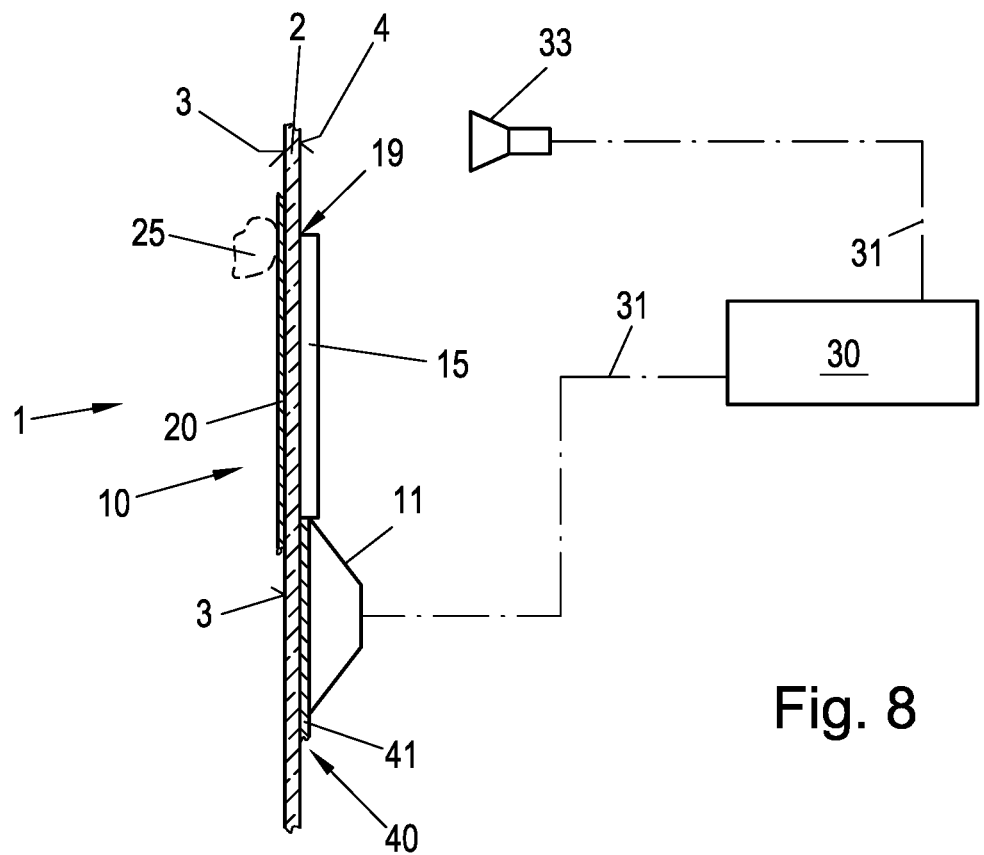
FIG. 8 shows in a partial cross-sectional view from the side an alternative variant of a cleaning device according to the invention together with the associated control system.

FIG. 8 shows a further alternative variant of a cleaning device 20 according to the invention together with the associated control system.

In this embodiment, a detail of a vehicle headlamp 1 is shown, wherein lens glass 10 is provided with a hydrophobic and dirt-repelling coating 25 arranged at outer side 11. At inner side 12 of lens glass 10, a vibration unit 23 is fastened here to a vibration element 21 by means of an adhesive layer 18. Inner side 12 is also protected by an anti-fog device 30 for example in the form of a fog-impeding coating against undesired condensation formation. A control device 40 serves to activate vibration element 21. Control device 40 is connected by means of signal lines 41 to a vibration element 21 or to a movement sensor 42 coupled with the vibration element 21. By means of a camera 43, which is arranged in interior 5 of headlamp 1 and which is also connected with a signal line 41 to control unit 40, soiling 29 for example in the form of dirt or raindrops is detected at lens glass 10. The activation of vibration element 21 thus takes place by means of a control device 40 after a signal is received from camera 43. Movement sensor 42 serves here to check the proper functioning of vibration element 21.

Alternatively or in addition to a camera 43, one or more sensors 42, for example optical sensors or moisture sensors, can also serve to activate the at least one vibration element 21. Such sensors 42, for example rain sensors, can be fastened directly to lens glass 10 or a cover glass not represented here or integrated into the latter. A camera 43, which is positioned in interior 5 of vehicle headlamp 1 and whose sensitivity can be programmed as to when soiling is detected as such and a corresponding camera signal is sent to control device 40, offers the advantage that it remains functionable with locally occurring soiling 29. An individual small sensor, which is fastened to the cover glass of the headlamp, may be masked by locally occurring severe soiling 29 on the cover glass and then possibly no longer functions. For this reason, it is expedient, when cleaning device 20 is activated by means of sensors 42 and without using a camera, to provide a redundant, possibly fail-safe activation of cleaning device 20. This can be achieved in that, for example, a plurality of sensors 42 are positioned at different points of lens glass 10 and/or the cover glass of the headlamp. In the case where a single sensor 42, in particular an optical sensor, does not function temporarily on account of local soiling, vibration element 21 of control device 40 can nonetheless be activated for lens glass 10 by means of control device 40 by further sensors 42 connected in parallel.

LIST OF REFERENCE NUMBERS 1 vehicle headlamp
2 cover glass
3 outer side of cover glass
4 inner side of cover glass
5 interior of vehicle headlamp
6 housing of vehicle headlamp
10 lens glass
11 outer side of lens glass
12 inner side of lens glass
15 supporting bezel, frame of lens glass
16 seal
18 adhesive, adhesive film
20 cleaning device
21 vibration element
22 piezoelement
23 vibration unit
24 housing of vibration unit
25 hydrophobic coating
29 soiling
30 anti-fog device
31 fog-impeding coating
32 heating element
33 heating wire
34 heating film
40 control device
41 signal line
42 sensor
43 camera

The invention claimed is:

1. A cleaning device (20) for a lens glass (10) of a vehicle, comprising:
   a supporting bezel (15);
   an optically transparent lens glass (10) attached to the supporting bezel (15);
   a hydrophobic and dirt-repelling, optically transparent coating (25), which is applied on an outer side (11) of the lens glass (10);
   at least one vibration element (21), which is coupled with the lens glass (10), wherein the at least one vibration element (21) can be activated by a control device (40); and
   an optically transparent anti-fog device (30), which is arranged at an inner side (12) of the lens glass (10),
   wherein the at least one vibration element (21) is coupled with the supporting bezel (15) and is integrated into the supporting bezel (15).

2. The cleaning device (20) according to claim 1, wherein the at least one vibration element (21) is fastened to the lens glass (10).

3. The cleaning device (20) according to claim 1, wherein the at least one vibration element (21) is permanently connected to the lens glass (10) and/or the supporting bezel (15) by jointing.

4. The cleaning device (20) according to claim 1, wherein the optically transparent anti-fog device (30) is a fog-impeding coating (31), which is applied on the inner side (12) of the lens glass (10).

5. The cleaning device (20) according to claim 1, wherein the optically transparent anti-fog device (30) comprises a heating element (32) with a heating film (34) and/or heating wires (33), wherein the heating film (34) and/or heating wires (33) is or are fastened to the inner side (12) of the lens glass (10) or at least partially integrated into the lens glass (10).

6. The cleaning device (20) according to claim 1, wherein an anti-reflection coating is applied at the outer side (11) and/or at the inner side (12) of the lens glass (10).

7. The cleaning device (20) according to claim 1, wherein the at least one vibration element (21) is a piezoelement (22) generating ultrasonic vibrations.

8. The cleaning device (20) according to claim 1, wherein two or more vibration elements (21) spaced apart from one another are coupled with the lens glass (10), wherein the two or more vibration elements (21) can each be activated by a control device (40).

9. The cleaning device (20) according to claim 1, wherein the control device (40) cooperates with a camera (43) and/or with a sensor (42).

10. The cleaning device (20) according to claim 1, wherein the activation of the at least one vibration element (21) takes place from the control device (40) according to an activation scheme, which is selected from cyclically recurring activation, manual activation, activation by means of a sensor signal, and activation by means of a camera signal.

11. The cleaning device (20) according to claim 1, wherein the lens glass (10) coupled with the at least one vibration element (21) is replaceable.

12. The cleaning device (20) according to claim 1, wherein the lens glass (10) is arranged inside a cover glass of a vehicle.

13. A vehicle with at least one cleaning device (20) according to claim 1.

14. The cleaning device (20) according to claim 9, wherein the sensor (42) is an optical sensor.

15. The cleaning device (20) according to claim 12, wherein the cover glass is selected from a windscreen, a sidelight, a backlight, a headlamp cover glass (2), and an optical lens.

\* \* \* \* \*